US007105130B2

(12) United States Patent
Telimaa et al.

(10) Patent No.: US 7,105,130 B2
(45) Date of Patent: Sep. 12, 2006

(54) ADJUSTABLE PIPETTE

(75) Inventors: Juha Telimaa, Jarvenpaa (FI); Tapani Pullinen, Hyvinkaa (FI); Vesa Salo, Rajamaki (FI); Mauno Heinonen, Vantaa (FI)

(73) Assignee: Thermo Electron Oy, Vantaa (FI)

( * ) Notice: Subject to any disclaimer, the term of this patent is extended or adjusted under 35 U.S.C. 154(b) by 318 days.

(21) Appl. No.: 09/973,730

(22) Filed: Oct. 11, 2001

(65) Prior Publication Data

US 2002/0041833 A1 Apr. 11, 2002

(30) Foreign Application Priority Data

Oct. 11, 2000 (FI) ................................ 20002241

(51) Int. Cl.
*B01L 3/02* (2006.01)
*G01N 1/22* (2006.01)

(52) U.S. Cl. .................... 422/100; 73/863.32; 73/864; 73/864.01; 73/864.02; 73/864.11; 73/864.16; 73/864.18

(58) Field of Classification Search ................ 422/100; 73/863.32, 864, 864.01, 864.02, 864.11, 864.16, 73/864.18

See application file for complete search history.

(56) References Cited

U.S. PATENT DOCUMENTS

| | | | | | |
|---|---|---|---|---|---|
| 3,810,391 | A | * | 5/1974 | Suovaniemi | 73/864.18 |
| 4,020,698 | A | * | 5/1977 | Marteau D'Autry | 73/864.18 |
| 4,141,250 | A | * | 2/1979 | D'Autry | 73/864.17 |
| 4,284,604 | A | | 8/1981 | Tervamäki | |
| 4,466,298 | A | * | 8/1984 | Tervamaki et al. | 73/864.18 |
| 4,501,163 | A | * | 2/1985 | MacDermott et al. | 73/864.13 |
| 4,567,780 | A | * | 2/1986 | Oppenlander et al. | 73/864.16 |
| 4,672,857 | A | * | 6/1987 | MacDermott | 73/864.18 |
| 4,877,585 | A | | 10/1989 | Perlman | |
| 4,988,481 | A | * | 1/1991 | Jarvimaki et al. | 422/100 |
| 5,320,810 | A | * | 6/1994 | Al-Mahareeq et al. | 422/100 |
| 5,355,738 | A | * | 10/1994 | Heinonen | 73/864.13 |
| 5,413,006 | A | | 5/1995 | D'Autry | |
| 5,531,131 | A | * | 7/1996 | Sabloewski | 73/864.18 |
| 5,650,124 | A | * | 7/1997 | Gilson | 422/180 |
| 6,158,292 | A | * | 12/2000 | Gilson et al. | 73/864.01 |

FOREIGN PATENT DOCUMENTS

| | | |
|---|---|---|
| CH | 679015 | 12/1991 |
| EP | 0 153 058 | 8/1985 |
| EP | 0 250 095 | 12/1987 |
| FI | 60359 | 9/1981 |
| WO | WO 91/05609 | 5/1991 |

* cited by examiner

*Primary Examiner*—Brian R. Gordon
(74) *Attorney, Agent, or Firm*—Oblon, Spivak, McClelland, Maier & Neustadt, P.C.

(57) ABSTRACT

A pipette includes a housing defining a suction chamber. A piston is configured to move in the suction chamber. A first retainer mechanism includes a first threading configured to limit a motion of the piston in the suction chamber. A second retainer mechanism includes a second threading configured to limit the motion of the piston in the suction chamber, the second threading having a pitch less than a pitch of the first threading.

10 Claims, 3 Drawing Sheets

ADJUSTABLE PIPETTE

FIELD OF THE INVENTION

The invention belongs to the field of liquid dispensing technology and relates to a piston-operated pipette, the suction volume whereof can be adjusted by means of threaded retainers provided in the pipette. The invention relates to the adjusting of the pipette suction volume.

BACKGROUND OF THE INVENTION

Adjustable piston pipettes comprise an upper and lower retainer of the piston movement, the location of at least one of said retainers can be changed. Generally the adjustment is realized by means of a screw-and-nut joint, for instance so that the retainer is provided with a screw, around which there is arranged a nut that does not rotate in relation to the housing but moves along guides along with the piston. The pitch of the screw threading defines the pace of the adjustment. Typically there are used 8–20 revolutions in the adjustment, depending on the size of the volume range. Usually pipettes of the described type also are provided with a calibration system whereby the basic position of the other retainer is set so that the dispensed liquid volume corresponds to the displaid volume as accurately as possible. Generally such pipettes also have a so-called secondary motion function. In said secondary motion, the desired liquid volume is sucked in the pipette by shifting the piston from the basic position to a desired upper position. When removing the liquid, the piston is depressed to a discharge position, somewhat below the basic position. Now liquid is removed from the pipette as completely as possible. In manually operated pipettes, the secondary motion function is realized so that they include a primary spring, against the force of which the piston is depressed from the upper position to the basic position, and a stronger secondary spring, against the force of which the piston is depressed to underneath the basic position.

A pipette of the described type is illustrated for instance in the publication FI 57543.

A general weakness of adjustable pipettes is their slowness in adjusting the volume. A screw-based adjusting operation can be speeded up by increasing the pitch of the threading. This, on the other hand, makes it more difficult to accurately set the desired volume, when already a slight turn changes the volume remarkably. The adjusting process becomes easier, if a high-pitched adjusting is realized in steps (see for example CH 679015). In that case, however, the close intermediate volumes are lost.

GENERAL DESCRIPTION OF THE INVENTION

The present invention relates to a pipette.

A pipette according to the invention comprises two retainers of the piston motion, based on adjusted threadings. One of the retainers has a range adjusting thread with a large pitch for rapidly choosing the desired volume range. The other retainer has a fine adjustment thread with a smaller pitch for accurately setting the desired volume. In addition, the pipette comprises a calibration system.

According to the invention, the volume is adjusted rapidly but accurately. An additional advantage of a manually operated pipette is an improved ergonomy, because, in the adjusting process, there are needed less revolutions than in a conventional pipette that is operated with a corresponding adjusting accuracy.

Advantageously the invention can be realized especially so that one of the retainers, for example the upper retainer, is provided with a range adjustment thread, and the other retainer is provided with a fine adjustment thread.

One of the threading arrangements, particularly the range adjustment arrangement, can be provided for example with a piston nut arranged by threadings in the piston shaft, which nut moves along with the piston but does not rotate along with the housing, and the second position of said nut, particularly the top position, is defined by a retainer arranged in the housing.

One of the threading arrangements, particularly the fine adjustment arrangement, can be provided for example with an adjusting nut arranged by threadings in the housing, and the piston may be provided with a corresponding retainer that defines the second position of the piston, particularly the lower position. In particular, the adjusting nut can be fitted inside the drilling of the piston housing.

The calibration system can be connected for instance to the fine adjustment retainer. It can be connected for instance to the above mentioned adjustment nut, in which case it can be provided for example with a retainer that is adjustable, particularly by a calibration thread arrangement. Preferably the calibration system is made such that the calibration cannot be accidentally changed for instance in connection with a normal setting of the volume.

Preferably the pipette also has a secondary motion function. This function may include for instance a primary spring on the side of the piston end, and a secondary spring connected for instance to the above mentioned retainer of the adjustment nut.

DRAWINGS

The appended drawings form part of the written description of the invention. They illustrate some preferred embodiment of the invention.

DETAILED DESCRIPTION OF SOME EMBODIMENTS OF THE INVENTION

Figure 1:
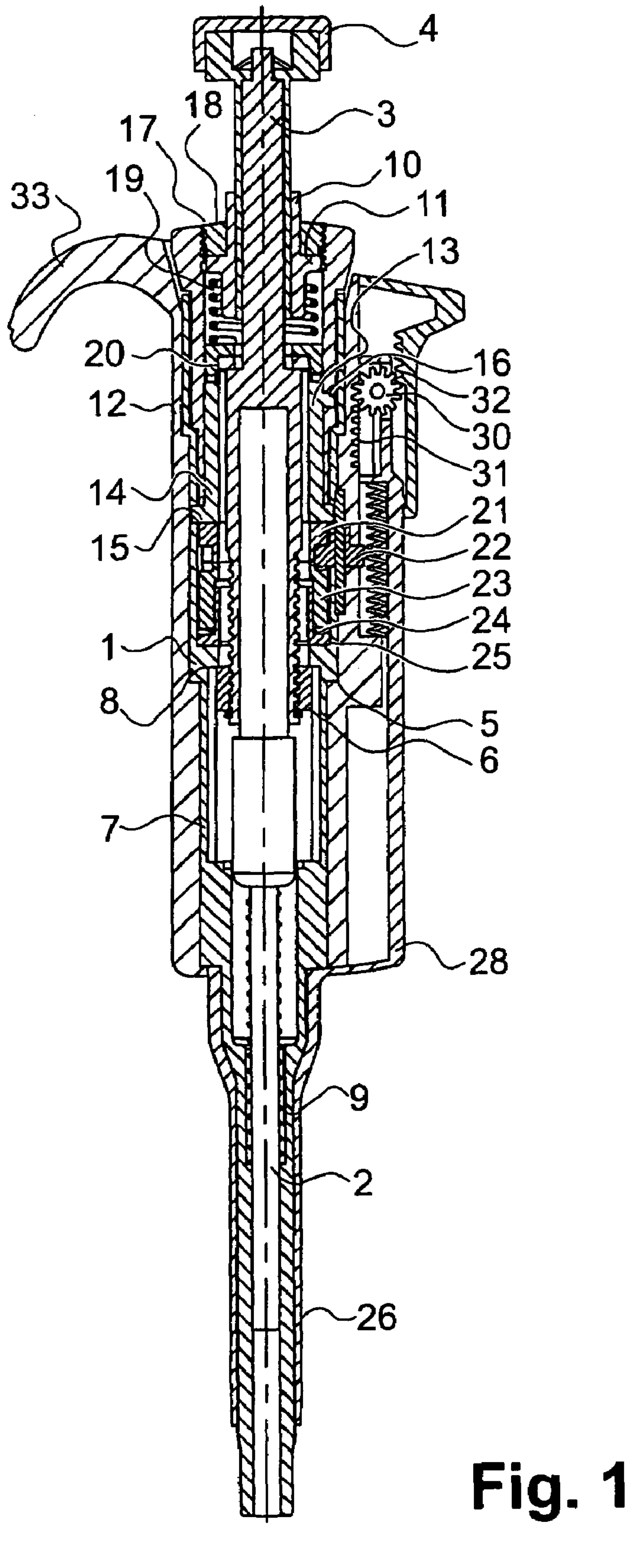
FIG. 1 illustrates a cross-section of the whole pipette.
Figure 2:
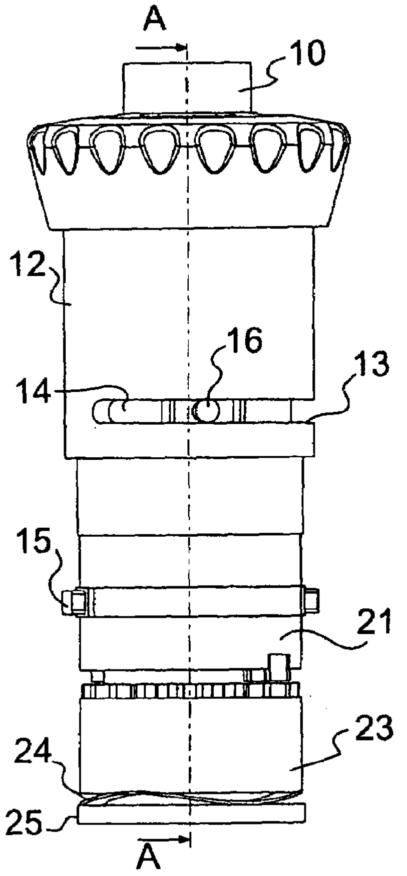
FIG. 2 illustrates the fine adjustment mechanism of the pipette.
Figure 3:
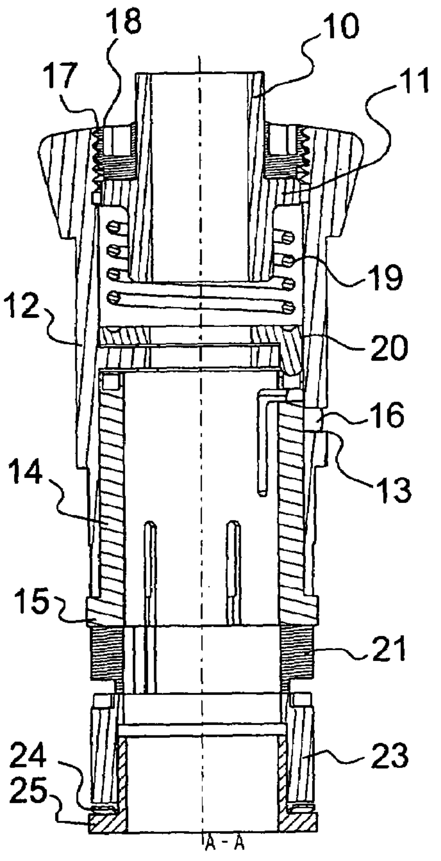
FIG. 3 illustrates a cross-section of the fine adjustment mechanism of the pipette.
Figure 4:
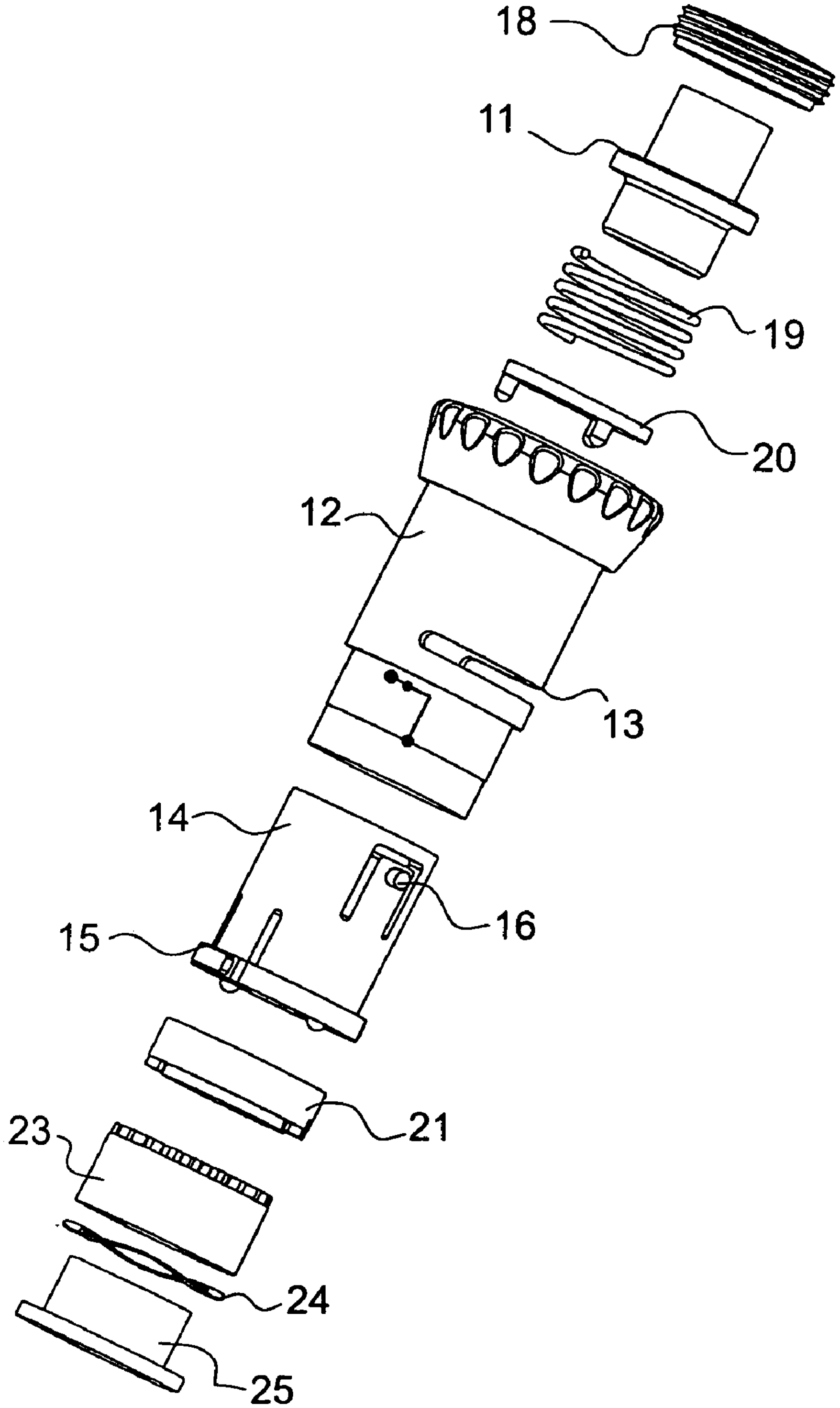
FIG. 4 shows the fine adjustment mechanism of the pipette in an exploded view.

Preferably a pipette according to the invention includes both an adjustable retainer of the lower limit of the piston motion and an adjustable retainer of the upper limit of the piston motion. Both retainers have a threading, by means of which the retainer's location in the motional direction can be set as desired. One of the threadings is a range adjustment threading, whereby the desired volume range is rapidly chosen. The other threading is a fine adjustment threading for setting the accurate volume in the chosen range. The pitch of the fine adjustment threading is smaller than that of the range adjustment threading. In addition, the pipette includes a calibration arrangement whereby the volume is set accurately to correspond to the desired volume.

The pitch of the range adjustment threading can be for instance such that the length of the piston stroke changes 1–8 mm/revolution, and preferably 3–5 mm/revolution. Respectively, when adjusting with the fine adjustment threading, the stroke length changes for example 0.1–0.8 mm/revolution, and preferably 0.3–0.5 mm/revolution.

The range of adjustment of the range adjustment threading within the pipette volume range can be for instance 1–10 revolutions, typically 3–5 revolutions. The range of adjustment of the fine adjustment threading can be for instance ⅓–2 revolutions, typically no more than one revolution.

The retainer may comprise a threading made in the piston shaft and provided with a nut, the turning of which nut with respect to the pipette housing is prevented. However, said nut can move along with the piston in the direction of the piston's motion. The piston housing is provided with a hindrance corresponding to the nut, and said hindrance defines the other limit of the motion. In addition, the housing may be provided with a turnable hindrance corresponding to the nut, which hindrance defines the other limit of the motion. Preferably the other retainer is, however, realized by means of a second set of threadings.

Preferably the range adjustment retainer defines the top limit for the piston motion. Advantageously the range adjustment retainer is placed in the piston shaft on the side of the suction chamber.

The fine adjustment can be realized for instance by means of a sleeve with a rising pitch.

Advantageously the pipette is provided with a volume display where the set volume can be seen. It is preferably a numerical display that can be either mechanical or electronic in operation. The display can be for example such that the fine adjustment threading affects the last digit, and the range adjustment threading affects all preceding digits. Typically the display has three digits. A mechanical display is preferably realized by means of a series of numbered rings.

The pipette is advantageously provided with a primary spring that presses the piston towards the top position.

In particular, the calibration arrangement can be connected to the fine adjustment retainer.

The pipette may also include a so-called secondary motion function, where the piston is pressed to below the lower limit when dispensing liquid. This ensures that the liquid is discharged as completely as possible.

Moreover, the pipette can be provided with a tip ejector mechanism whereby the used tip is ejected from the pipette. Advantageously said mechanism is made smoother by means of a lever function, as is described in the publication FI 92374 (corresponds to the publication U.S. Pat. No. 5,435,197). The lever can be realized for instance as a cogged wheel or a pulley mechanism.

Naturally the pipette may also have multiple channels.

In the pipette according to the drawings, the pipette has an elongate housing 1 provided with a suction chamber open at the bottom. At the bottom end of said suction chamber, there is attached a tip container (tip) for the liquid to be sucked in. In the suction chamber, there moves a piston 2, which is sealed at the top end of the suction chamber. The top end of the piston is provided with a shaft 3 extending to above the housing. The top end of the shaft comprises a knob 4.

The shaft 3 is provided with a threading (or first threading) 5, wherein a rotatable nut 6 is fitted. The rotation of the nut with respect to the housing 1 is prevented by a longitudinal guide-and-groove arrangement 7. When the shaft is turned, the nut moves along the shaft. The top position of the nut is limited by a top hindrance 8. It is a flange located inside the shaft above the nut, the diameter of said flange being smaller than the outer diameter of the nut. Thus the top limit of the piston stroke, and consequently also the length of the stroke, can be adjusted by turning the shaft.

The housing is provided, around the piston 2, between a threshold arranged in the bottom part of the housing and an extension arranged in the piston, a return spring 9 that presses the piston towards the top position.

Around the shaft 3, in the top part thereof, there is arranged a retainer sleeve 10 provided with a flange 11. The retainer sleeve is surrounded by a fine adjustment sleeve 12. The jacket of the fine adjustment sleeve is cut by a groove (or second threading) 13 with a fairly low-gradient pitch. Inside the fine adjustment sleeve, there is arranged an inner sleeve 14, the bottom end whereof extends to below the fine adjustment sleeve. At the bottom end of the inner sleeve, there is arranged a flange 15, which is wider than the bottom end of the fine adjustment sleeve. In said flange, and in a corresponding spot in the housing, there is arranged a locking arrangement whereby the turning of the inner sleeve with respect to the housing is prevented. On the outer surface of the inner sleeve, there is a pin 16 fitted in the groove of the fine adjustment sleeve. Said pin is arranged in an elastic tongue provided by grooves, which tongue is sufficiently flexible in order to allow the inner sleeve to be pushed inside the adjustment sleeve. Inside the top end of the fine adjustment sleeve, there is arranged a threading (or calibration threading) 17 provided with a nut 18, which nut keeps the retainer sleeve inside the fine adjustment sleeve. Around the retainer sleeve, there is arranged a secondary spring 19 that is more rigid than the return spring 9. The bottom end of said secondary spring presses, by intermediation of a plate 20, against the threshold provided in the shaft 3, and the top end thereof presses against the flange of the retainer sleeve.

The top edge of the fine adjustment sleeve 12 that extends to above the housing is serrated in order to improve the grip with the sleeve.

When the shaft 3 is depressed, the piston 2 moves against the force of the return spring 9, until the lower surface of the knob 4 meets the top end of the retainer sleeve 10. Now the tip provided at the bottom end of the pipette is plunged in the liquid to be dispensed and the piston is allowed to return to the top position, so that liquid is sucked in the tip. When discharging the liquid from the tip, the shaft is likewise depressed, until the knob meets the retainer sleeve, whereafter it is depressed even further against the force of the secondary spring 19, so that the liquid is discharged from the container as completely as possible.

When adjusting the suction volume, the shaft 3 is first turned by the knob 4 until the desired range is achieved. This adjustment sets the upper limit for the suction motion of the piston 2. Owing to the high pitch of the threading 5, this operation is always carried out swiftly. The fine adjustment is then performed by turning the fine adjustment sleeve 12 by its top end. This operation sets the lower limit for the suction motion of the piston. The nut 18 is attached to the retainer sleeve 10 so tightly that it is virtually not turned along with the retainer sleeve. When necessary, a suitable adhesive can also be used for this purpose. The top surface of the nut is provided with slots by which the nut can be turned for instance by using a suitable tool. Also the pipette calibration is carried out by means of the nut 18.

The volume display is realized by three numeral discs. The pin arranged in the shaft 3 revolves step by step around the middle disc 21, which in turn, by intermediation of a transmission wheel 22, shifts the first numeral disc 23 step by step. The last numeral is indicated at the bottom edge of the fine adjustment sleeve. In between the first numeral disc and the top retainer, there is arranged a flat spring 24 and a flange sleeve 25. The numerals are visible for the user through an aperture provided in the housing 1.

The pipette also includes a tip ejector comprising an ejector sleeve 26 sliding along the surface of the bottom end of the pipette and a connected press key 28 working against the force of the spring, which press key is located on the side of the outer casing of the housing. The press key is connected to a lever mechanism realized by means of a cogged wheel 30 and cogged shafts 31 and 32; the purpose of said lever mechanism is to reduce the force needed in the ejection.

On the opposite side of the tip ejector, at the top end of the housing 1, there is arranged a finger support 33.

The invention claimed is:

1. A pipette comprising:

a housing defining a suction chamber;

a piston configured to move in said suction chamber;

a first retainer mechanism having a first threading and a first corresponding threading, the first threading being configured to limit a motion of the piston in the suction chamber by cooperating with the first corresponding threading;

a second retainer mechanism having a fine adjustment sleeve having a groove and a pin received within the groove, the groove being configured to limit the motion of the piston in the suction chamber by cooperating with the pin, the groove having a pitch less than a pitch of the first threading;

a further threading; and a nut configured to calibrate a movement of the piston in the housing by cooperating with the further threading.

2. The pipette according to claim 1, wherein the first retainer mechanism is configured to define an upper limit of the motion of the piston, and the second retainer mechanism is configured to define a lower limit of the motion of the piston.

3. The pipette according to claim 1, wherein the first retainer mechanism further comprises a shaft connected to the piston and a first retainer nut, the shaft having the first threading and the first retainer nut having the first corresponding threading.

4. The pipette according to claim 3, wherein the first threading and the first corresponding threading cooperate to define an upper limit of the motion of the piston.

5. The pipette according to claim 1, wherein the groove and the pin cooperate to define a lower limit of the motion of the piston.

6. The pipette according to claim 1, wherein the pitch of the first threading is from 1 to 8 mm/revolution, and the pitch of the groove is from 0.1 to 0.8 mm/revolution.

7. The pipette according to claim 1, wherein the pitch of the first threading is from 3 to 5 mm/revolution, and the pitch of the groove is from 0.3 to 0.5 mm/revolution.

8. The pipette according to claim 3, wherein a range of adjustment of the first threading is from 1 to 10 revolutions of the shaft.

9. The pipette according to claim 8, wherein the range of adjustment of the first threading is from 3 to 5 revolutions of the shaft.

10. The pipette according to claim 1, wherein a range of rotation of said fine adjustment sleeve for adjustment is less than or equal to one revolution of the fine adjustment sleeve.

* * * * *